Nov. 9, 1954    O. L. NEBERGALL ET AL    2,693,660
CASTING ROD HOLDER
Filed Jan. 5, 1951
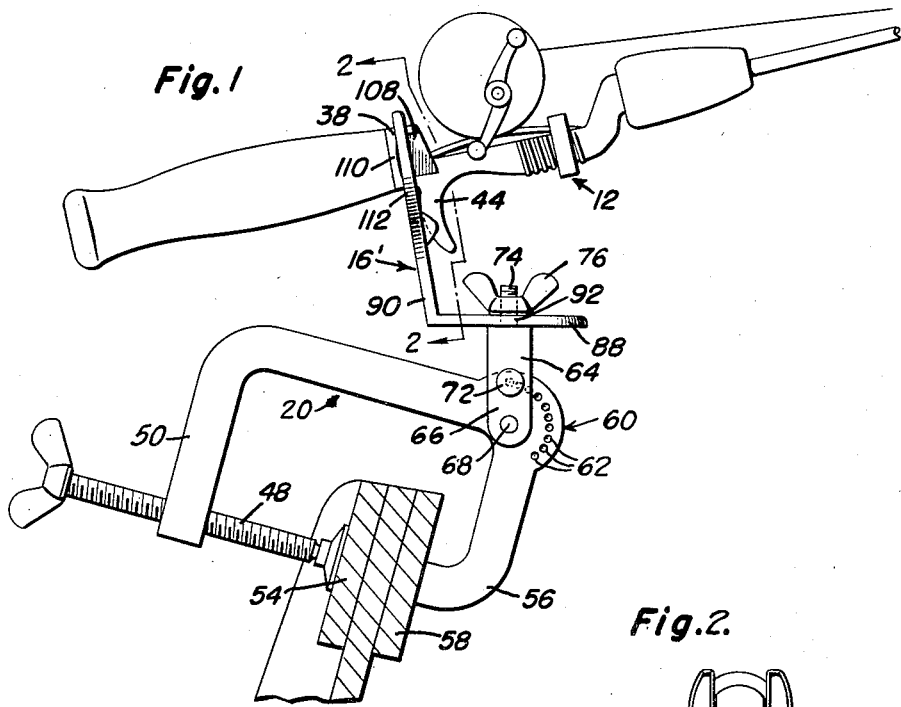
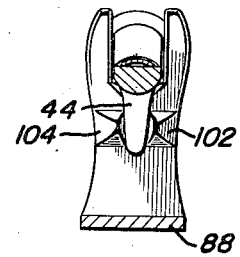
Fig. 2.
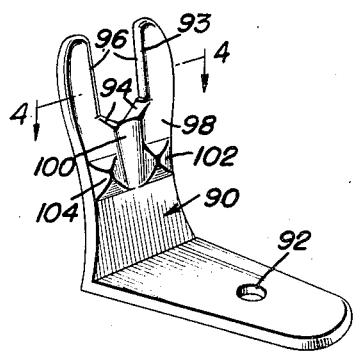
Fig. 3.
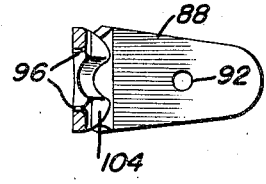
Fig. 4.
Inventors
Otto L. Nebergall
Kenneth Lester
By *Clarence A. O'Brien*
*and Harvey B. Jacobson*
Attorneys

United States Patent Office 2,693,660
Patented Nov. 9, 1954

2,693,660

CASTING ROD HOLDER

Otto L. Nebergall and Kenneth Lester, Ottawa, Ill.

Application January 5, 1951, Serial No. 204,534

1 Claim. (Cl. 43—21.2)

The present invention relates to improvements in fishing rod holders and more particularly fishing rod holders which are adapted to slidably receive the handle grip portion of fishing rods for fixably maintaining the casting rod in a preselected inclined position.

An object of the present invention is to provide a bracket means for fixably mounting a fishing rod holder in preselected relation to a supporting surface such as the side of a boat or the like.

Still another object of the present invention is to provide a fishing rod holder which is adapted to engage a portion of the handle below the trigger grip, with the trigger grip engaging a face of an upstanding arm of the holder whereby the fishing rod will be fixably maintained in an angular relation to the holder.

Various other objects and advantages will become apparent from the detailed description to follow. The best forms in which I have contemplated applying my invention are clearly illustrated in the accompanying drawings, wherein:

Figure 1 is a side elevational view showing one form of my fishing rod holder which is adapted to be employed for supporting conventional rods;

Figure 2 is a vertical sectional view taken substantially along the plane of line 2—2 of Figure 1;

Figure 3 is a detailed perspective view of the fishing rod holder per se; and

Figure 4 is a horizontal transverse sectional view taken substantially along the plane of line 4—4 of Figure 3.

Referring to the drawing by numerals in the form of the invention shown, it will be noted that the fishing rod holder 16' is comprised of a substantially L-shaped member having a base 88 and an arm 90 extending upwardly and angularly therefrom. The base 88 is formed with an aperture 92 therethrough for receiving a reduced threaded portion 74 of a standard 64. A wing nut 76 on said portion 74 secures said base 88 on said standard 64.

The arm 90 is best shown in Figure 3 as being formed with an open ended notch 93 having inclined end walls 94 and upstanding side walls 96. The inner face 98 of the arm 90 is formed with a vertically extending groove 100, which is in communication with the lower end of the notch 93. A pair of projections 102 and 104 are positioned on opposite sides of the groove 100.

As seen in Figures 1 and 2, the trigger grip 44 is engageable in the groove 100 with the lower end portion thereof engaged between the projections 102 and 104 to prevent angular displacement of the fishing rod on the fishing rod holder 16'.

The pistol grip portion 12 has its lower end portion 38 formed with flattened side walls 108 which are adapted to be received between the upstanding walls 96 of the groove 93.

It will thus be seen that the enlarged portion 110 of the pistol grip 12 will engage the back side 112 of the arm 90 to prevent pivoting movement of the fishing rod with respect to the fishing rod holder 16'.

Mounting means for the fishing rod holder 16' comprises a C-clamp 20 having a clamping screw 48 in one leg 50 for engaging the inner surface of a boat, as at 54, while the other leg 56 of said clamp is engaged with the outer surface of the boat, as at 58. The standard 64 has a lower end portion 66 pivoted, as at 68, to an upstanding, intermediate portion 60 on said C-clamp 20. A set pin 72 in said lower end portion 66 is selectively engageable in openings 62 arranged in an arcuate series in said portion 66 concentric to the pivot 68. As will be seen, the angular relation of the standard 64 with respect to the boat may be varied by pivoting said standard and engaging the set pin 72 in a selected opening 62.

It will be readily seen by one skilled in the art that the fishing rod holder of Figures 1 through 4 is best adapted for use with certain types of fishing rods, such as the rod illustrated in the Gephart Patent No. 1,909,529 which was issued on May 16, 1933.

Of course, certain modifications may be made in the fishing rod holder and mounting means for adapting the same to fishing rod holders of different construction and such modifications are intended to be included within the scope of the accompanying claim.

Having described the invention, what is claimed as new is:

A holder for a fishing rod having a handle with a reduced front end and a trigger below said end comprising a substantially L-shaped member having a base having an upstanding arm, said arm being formed at its upper end with a notch therein for removably receiving the reduced end of the handle for supporting the same, the inner face of said arm being provided with a groove relatively narrower than said notch extending downwardly from the notch for seating the trigger therein in exposed position for gripping by the finger of a hand grasping the handle to remove the same, and a pair of projections on said arm disposed upon opposite sides of the groove and spaced below said notch and engageable with opposing sides of the trigger to guide said trigger into the groove.

References Cited in the file of this patent

UNITED STATES PATENTS

| Number | Name | Date |
|---|---|---|
| 541,114 | Nolan | June 18, 1895 |
| 1,558,808 | Hull | Oct. 27, 1925 |
| 2,184,583 | Danko | Dec. 26, 1939 |
| 2,447,128 | Logan | Aug. 17, 1948 |
| 2,484,427 | Schwenk | Oct. 11, 1949 |
| 2,515,426 | Rodgers | July 18, 1950 |
| 2,522,255 | Climo | Sept. 12, 1950 |

FOREIGN PATENTS

| Number | Country | Date |
|---|---|---|
| 162,427 | Great Britain | Feb. 10, 1920 |